(12) United States Patent
Cape et al.

(10) Patent No.: US 9,547,565 B2
(45) Date of Patent: Jan. 17, 2017

(54) TECHNIQUES FOR MESSAGE RETRANSMISSION MECHANISM

(71) Applicant: IEX Group, Inc, New York, NY (US)

(72) Inventors: James Michael Cape, New York, NY (US); Robert Park, New York, NY (US); Allen Zhang, Princeton, NJ (US); Zoran Perkov, Brooklyn, NY (US); Lieting Yu, Warren, NJ (US); Prerak Pukhraj Sanghvi, Jersey City, NJ (US); Beau Tateyama, New York, NY (US); Constantine Sokoloff, Jersey City, NJ (US); Eric Quinlan, Norwalk, CT (US)

(73) Assignee: IEX Group, Inc., New York, NY (US)

( * ) Notice: Subject to any disclaimer, the term of this patent is extended or adjusted under 35 U.S.C. 154(b) by 116 days.

(21) Appl. No.: 14/644,606

(22) Filed: Mar. 11, 2015

(65) Prior Publication Data

US 2015/0261625 A1    Sep. 17, 2015

Related U.S. Application Data

(60) Provisional application No. 61/951,364, filed on Mar. 11, 2014, provisional application No. 61/951,390, filed on Mar. 11, 2014.

(51) Int. Cl.
| | |
|---|---|
| *G06F 11/00* | (2006.01) |
| *G06F 11/16* | (2006.01) |
| *G06F 11/07* | (2006.01) |
| *G06F 11/14* | (2006.01) |
| *G06F 11/20* | (2006.01) |

(52) U.S. Cl.
CPC ........ *G06F 11/1658* (2013.01); *G06F 11/0709* (2013.01); *G06F 11/1443* (2013.01); *G06F 11/202* (2013.01)

(58) Field of Classification Search
CPC .............. G06F 11/1443; G06F 11/0709; G06F 11/1658; G06F 11/202; G06Q 40/04
See application file for complete search history.

(56) References Cited

U.S. PATENT DOCUMENTS

| | | | |
|---|---|---|---|
| 8,832,211 B1 † | 9/2014 | Lebedev | |
| 9,197,428 B1 * | 11/2015 | Lebedev | ................ G06Q 40/04 |
| 2002/0120837 A1 * | 8/2002 | Maxemchuk | .......... G06Q 40/04 713/153 |
| 2012/0096308 A1 * | 4/2012 | Yamagami | .............. G06F 3/067 714/6.3 |

(Continued)

OTHER PUBLICATIONS

International Search Report (dated May 17, 2015).

*Primary Examiner* — Charles Ehne
(74) *Attorney, Agent, or Firm* — Goodwin Procter LLP

(57) ABSTRACT

Embodiments of the Message Retransmission Mechanism Apparatuses, Methods and Systems ("MRM") transform application requests for message journals via MRM components into expedited access to segmented message streams. In one implementation, the MRM may obtain message journal of messages written by applications during system operations and divide up the message obtained from the complete message journal into message segments. In some implementations, the MRM may provide recovering applications access to said message segments for expedited message consumption.

19 Claims, 5 Drawing Sheets

(56) References Cited

U.S. PATENT DOCUMENTS

| | | | | |
|---|---|---|---|---|
| 2014/0164207 A1* | 6/2014 | Rotella | ............ | G06Q 40/04 705/37 |
| 2015/0081508 A1* | 3/2015 | Schwall | ............ | G06Q 40/04 705/37 |

\* cited by examiner
† cited by third party

TECHNIQUES FOR MESSAGE RETRANSMISSION MECHANISM

CROSS-REFERENCE TO RELATED APPLICATION(S)

The present application claims priority to: (a) U.S. Provisional Application No. 61/951,364, filed Mar. 11, 2014; and (b) U.S. Provisional Application No. 61/951,390, filed Mar. 11, 2014. The subject matter of the present application is related to U.S. Utility application Ser. No. 14/644,674, filed Mar. 11, 2015, which claims priority to U.S. Provisional Application No. 61/951,374, filed Mar. 11, 2014. The subject matter of the present application is also related to PCT International Application No. PCT/US2013/059558, filed Sep. 12, 2013. Each of the above-referenced related applications is incorporated herein by reference in its entirety.

This application for letters patent discloses and describes various novel innovations and inventive aspects of message retransmission mechanism and memory address space management technologies (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address techniques for application message journaling management, and more particularly, include Message Retransmission Mechanism Apparatuses, Methods and Systems ("MRM").

BACKGROUND

In one aspect of a computer system, during its operations, software applications may write messages to a journal as they perform actions or react to external events. Apart from writing their own messages, software applications sometimes access messages written by other applications.

SUMMARY OF THE INVENTION

Embodiments of the Message Retransmission Mechanism Apparatuses, Methods and Systems ("MRM") transform application requests for message journals via MRM components into expedited access to segmented message streams. In one implementation, the MRM may obtain message journal of messages written by applications during system operations and divide up the message obtained from the complete message journal into message segments. In some implementations, the MRM may provide recovering applications access to said message segments for expedited message consumption.

According to one particular embodiment of the present invention, an expedited message retransmission method for a computer system may comprise the steps of: maintaining, in a storage medium of the computer system, a master journal of sequenced messages generated from a plurality of messages written by applications or processes during operations of the computer system, at least one subset of said applications or processes requiring access to said sequenced messages to function properly; determining an estimated demand for access to said sequenced messages by said at least one subset of applications or processes that may experience failovers; generating, based on said estimated demand, one or more journal copies and/or one or more journal segments by duplicating content of said master journal, each said journal copy or journal segment being independently accessible by a single application or process at any given moment; and allocating said one or more journal copies and/or said one or more journal segments, upon demand, to some of said at least one subset of said applications or processes that have experienced failovers or a gap in said sequenced messages, such that multiple applications or processes can simultaneously access the content of said master journal, thereby expediting access to said sequenced messages in said master journal by said some applications or processes in their recovery from said failovers or said gap in said sequenced messages.

According to another particular embodiment of the present invention, a computer system implementing expedited message retransmission may comprise at least one computer processor and at least one storage medium disposed in communication with the at least one computer processor. The at least one storage medium may store computer instructions to cause the at least one computer processor to: maintain, in said at least one storage medium of the computer system, a master journal of sequenced messages generated from a plurality of messages written by applications or processes during operations of the computer system, at least one subset of said applications or processes requiring access to said sequenced messages to function properly; determine an estimated demand for access to said sequenced messages by said at least one subset of applications or processes that may experience failovers; generate, based on said estimated demand, one or more journal copies and/or one or more journal segments by duplicating content of said master journal, each said journal copy or journal segment being independently accessible by a single application or process at any given moment; and allocate said one or more journal copies and/or said one or more journal segments, upon demand, to some of said at least one subset of said applications or processes that have experienced failovers or a gap in said sequenced messages, such that multiple applications or processes can simultaneously access the content of said master journal, thereby expediting access to said sequenced messages in said master journal by said some applications or processes in their recovery from said failovers or said gap in said sequenced messages.

According to yet another particular embodiment of the present invention, a non-transitory computer readable medium may have computer instructions which, when executed, causes a computer system to implement expedited message retransmission. The non-transitory computer readable medium may comprise code for: maintaining, in a storage medium of the computer system, a master journal of sequenced messages generated from a plurality of messages written by applications or processes during operations of the computer system, at least one subset of said applications or processes requiring access to said sequenced messages to function properly; determining an estimated demand for access to said sequenced messages by said at least one subset of applications or processes that may experience failovers; generating, based on said estimated demand, one or more journal copies and/or one or more journal segments by duplicating content of said master journal, each said journal copy or journal segment being independently accessible by a single application or process at any given moment; and allocating said one or more journal copies and/or said one or more journal segments, upon demand, to some of said at least one subset of said applications or processes that have experienced failovers or a gap in said sequenced messages, such that multiple applications or processes can simultaneously access the content of said master journal, thereby expediting access to said sequenced messages in said master journal by said some applications or processes in their recovery from said failovers or said gap in said sequenced messages.

One technical effect of the present invention is to speed up the access to and consumption of a journal of sequenced messages by applications or processes which in turn significantly speeds up the recovery of failed applications or processes.

Another technical effect of the present invention is the dynamic adjustment or control of journal access by multiple applications or processes including load-balancing among journal copies/segments based on an estimated demand for journal access.

Other benefits, advantages, or technical effects may be appreciated by those of ordinary skill in the art reading the disclosure herein and/or by practicing one or more embodiments of the present invention.

BRIEF DESCRIPTION OF THE DRAWINGS

The accompanying appendices, drawings, figures, images, etc. illustrate various exemplary, non-limiting, inventive aspects, embodiments, and features ("e.g.," or "example(s)") in accordance with the present disclosure.

DETAILED DESCRIPTION OF THE INVENTION

Embodiments of the Message Retransmission Mechanism Apparatuses, Methods And Systems (hereinafter "MRM") may transform application requests for message journals, via MRM components, into expedited access to segmented message streams.

Figure 1:
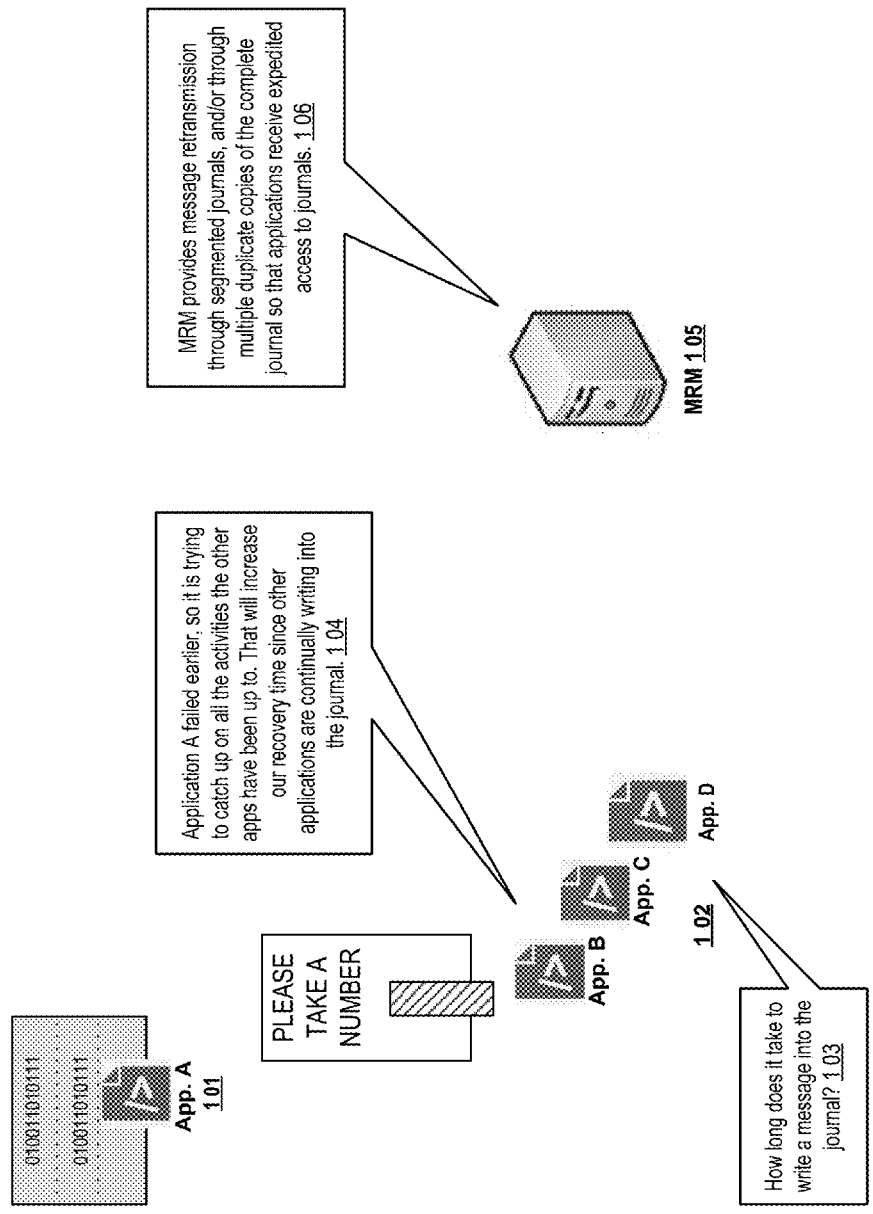
FIG. 1 shows block diagrams illustrating examples of the MRM providing application message journaling management according to an embodiment of the present invention.

FIG. 1 shows block diagrams illustrating examples of the MRM providing application message journaling management to applications needing access to message journals. In some implementations, applications write messages to a journal as they perform actions and/or react to external events during normal system operations. For example, applications may need to receive and process messages that come from external parties, such as but not limited to messages related to securities transactions and markets. For example, the software applications of an electronic trading system may be exchanging and processing Financial Information eXchange (FIX) formatted messages such as, but not limited to order entry, modify, cancel, etc., trading messages, order confirmation reports, market data messages and/or the like. In some embodiments, the applications may write into a journal to record their activities as they exchange messages with other applications and/or external third parties and process the messages and act upon them. In some embodiments, the applications may need to be apprised of the activities of some or all of the other applications executing during system operation, and in some embodiments may need to access the message journal that may contain the messages written by all applications. For example, an application 101 may have a gap in its consumption of journal messages and may need to access the journal to fill the gap. For instance, the application may have crashed and/or dropped messages as a result of transmission issues (e.g., at the network layer, etc), and it may need to recover the missing messages from the journal. In some embodiments, it may also need to write messages of its own into the journal.

In some implementations, an application 101 may need to access the journal regularly to re-access missed messages and fill any gaps in its journal message consumption. In some implementations, an application's repeated requests to the messages of a journal may interfere with other applications' 102 requests for access to the same journal. For example, a request by an application 101 may compete with the requests of other applications 102 and result in a queue of applications waiting for their turn to access the journal, e.g., 103. In some implementations, the waiting applications may themselves be trying to recover missing messages, and as they wait for the journal to become available, they may end up falling further behind in their recovery. For example, other applications may be writing into the journal while an application is waiting, resulting in an increased recovery time for the waiting application as it may need to access the messages written into the journal when the application was in a queue, e.g., 104. In some implementations, this may create a chain reaction of increasing wait and recovery time for subsequent waiting applications and may result in degraded performance for the waiting applications and/or the system as a whole.

In some implementations, the MRM may provide the applications an expedited access to journals via the generation of multiple duplicate copies and segmentation of the complete message journal, e.g., 106. For example, the MRM may avail to the applications a series of journals giving the applications more than one source to recover from. In these embodiments, the process of accessing journals may be more load-balanced in that there may be more queues but shorter ones.

In some embodiments, even the shorter queues may have a long wait time though. For example, a recovering application may have a large amount of messages to catch up with, and as such may take a long time at a journal, causing a long delay for other applications in the queue, however short the queue is. Accordingly, the MRM may further provide for an expedited turnaround at a journal access point by splitting up the complete message journal into several segments and availing the segments to several applications simultaneously. For example, applications may proceed from one segmented journal to another obtaining the relevant messages they need for recovery but without spending extended amount of time at one journal and causing delay to other applications that need access to the journals for recovery.

Figure 2:
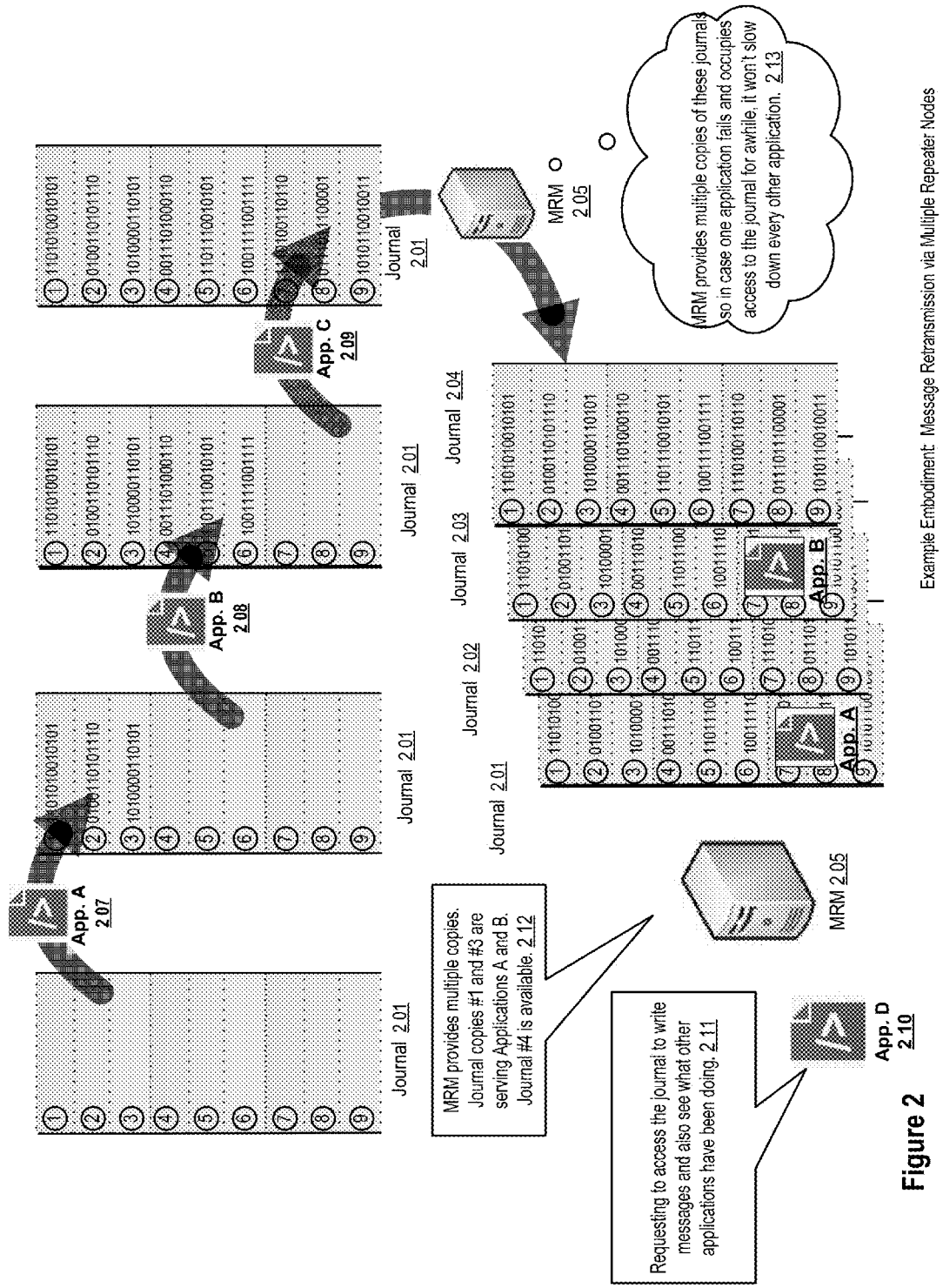
FIG. 2 shows a diagram illustrating examples of providing applications via an MRM component duplicates of complete message journals for recovery according to embodiments of the present invention.

With reference to FIG. 2, in some implementations, applications 207 may write messages to a journal 201 as they perform actions or react to external events. In some implementations, the applications 208-209 may be reading the messages of other applications and keeping abreast of all the activities during system operations. For example, application A may write messages in the first three rows of journal 201, and a subsequent application B may read these messages as it is also writing its own messages on the next batch of available rows in the journal (e.g., the next three rows). In some implementations, an application 210 may have experienced a gap in its consumption of the journalled messages. For example, the application may have dropped messages as a result of transmission issues at the network layer and now may need a means to recover the lost messages, e.g., 211. In some implementations, there may be other applications that may seek access to the journal for their own recovery needs and a queue may form if there is only one journal, or the number of journal copies available is not sufficient to meet the demands of the applications in queue. In some implementations, the MRM may provide duplicate copies 202-204 of the complete message journal to allow applications expedited access to missed messages, e.g., 213. For example, if one journal is occupied by a given application, other applications may recover missed messages from one of the other available journals that may be duplicates of the first journal, e.g., 212.

In some implementations, even with multiple duplicate journals, a queue may form if one application occupies a journal for an extended period of time. For example, an application may be starting up fresh and/or may have missed a large amount of messages. For example, the application may have started later in the day and may need to catch up to all of the messages that may have already been processed. In some implementations, it may take the application a long time to recover and process all missed messages, occupying a single journal and causing a queue and delayed recovery for other applications that may need access to the journal.

Figure 3:
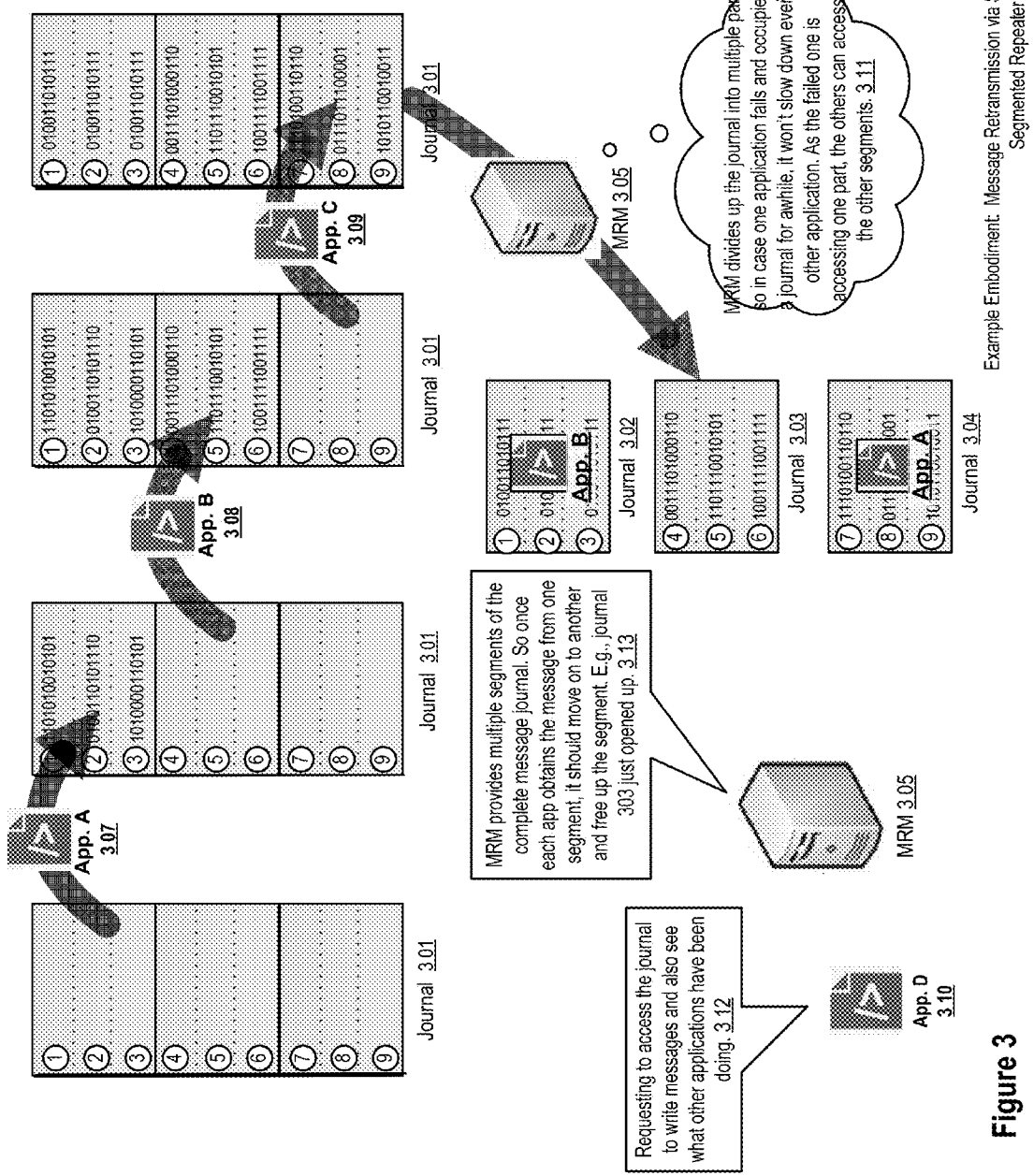
FIG. 3 shows a datagraph diagram illustrating examples of providing applications via an MRM component stream segmented message journals for recovery according to embodiments of the present invention.

With reference to FIG. 3, in some embodiments, applications 307-309 may write messages to a journal 301 as they perform actions or react to external events, and may also need to keep up with messages written by other applications to the journal, as described in detail above with reference to FIG. 2. In some embodiments, an application recovering missed messages may occupy the journal for an extended time, and compete with the requests of other applications for access to same journal. In some embodiments, the MRM may provide the applications an expedited access to journals via the segmentation of the complete message journal and/or its multiple duplicate copies, e.g., 311. For example, the MRM may divide up the complete message journal into segments 302-304 and assign specific segments to specific journals to avail the message segments to several applications simultaneously, e.g., 313.

In some embodiments, a disconnected application 310 seeking to recover missed messages may obtain a segment of the complete journal message from one segment, before moving on to the next journal to obtain another segment of the original complete message. In such embodiments, the time the application spends at each journal may be less than what it would have spent obtaining the complete message from only one journal. For example, once the disconnected application obtains the message segment from one journal, it may move on to another journal allowing other applications quicker access to said one journal. In some embodiments, if the disconnected application still has a message gap, it may proceed to other journals that contain the relevant message segments and access those messages from these journals. In some embodiments, the time each application spends at a given journal may be limited, allowing for shorter and faster queues of applications waiting for access to messages stored in journals. For example, with segmented message journals, the time each application spends on any given journal may be less than it would have spent on a journal with a complete message, and as such may lead to a faster message gap filling for applications trying to receiver missed messages, e.g., 312.

Figure 1A:
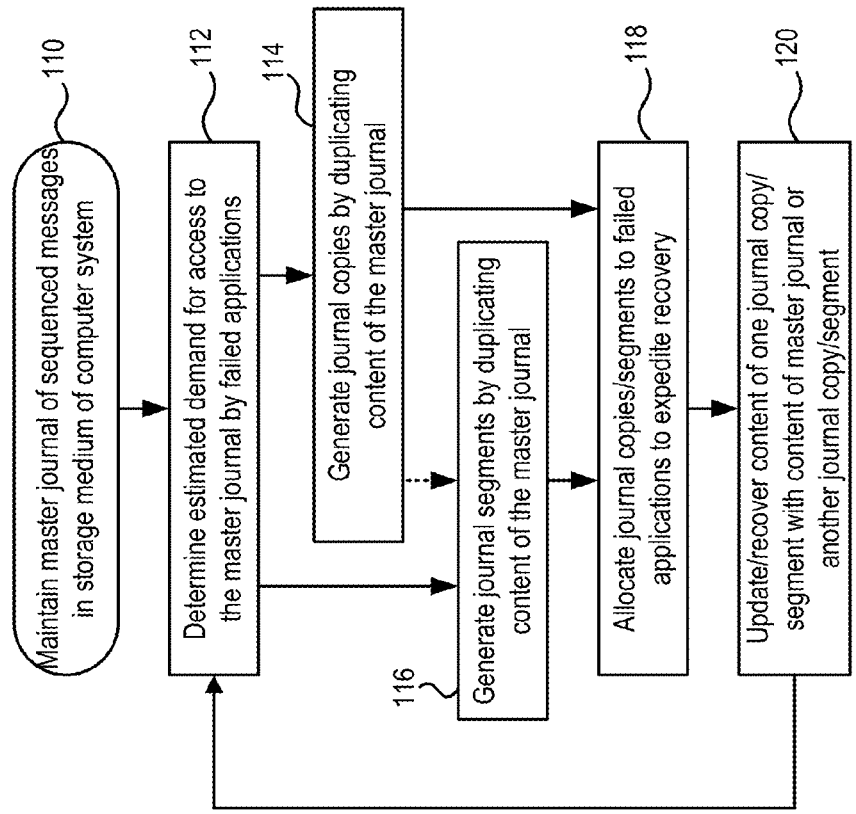
FIG. 1A shows a flow chart illustrating one exemplary process for message journaling management according to an embodiment of the present invention.

FIG. 1A shows a flow chart illustrating one exemplary process for message journaling management according to an embodiment of the present invention. The exemplary process or its variations may be implemented in any computer system where the order or sequence by which events occur is important. For example, the computer system may be an electronic trading system, an auction-based sale system, or a gaming system. For illustration, the preferred embodiments are described in the context of an electronic trading system such as one implemented by a securities exchange.

In Step 110, the computer system may maintain a master journal of sequenced messages in its storage medium. For example, in an electronic trading system for financial instruments such as stocks and bonds, the core software applications, such as FIX order entry/trading gateways, matching engine, market data applications, reference data applications, and post-trade integration applications may be running on one or more computer servers simultaneously, and the applications all communicate via a central messaging bus and thereby generate a large number of messages at any given moment. These messages may include but are not limited to orders, trades, quotes, inter-application communication, and so on. The un-sequenced messages are all routed through a sequencer which arranges them into a sequenced stream according to the order in which they were processed/sequenced. As a result, the sequencer continues to generate a high fidelity deterministic record (a.k.a. the "journal") of all messages in their right order.

The journal is then republished or made available to the components of the trading system which, to perform their respective functions, need access to the sequenced messages. If one of the components (e.g., an application or process, referred to hereinafter simply as "application") has to recover from a failover, it must catch up with the ever-growing sequence of messages, by accessing the message journal, in order to return to its intended functioning state. For instance, a crash of just 10 seconds could cause an application to miss multiple millions of messages—it has to catch up with those millions of messages before it could function again. The message journal is therefore critical to system recovery and redundancy. The message journal also helps an exchange to meet its books and records requirements.

However, if a significant number of applications have failed, for example, during hardware failure of a server supporting several applications, the demand for access to the message journal would spike, especially during busy trading hours. With so many applications wanting to catch up on the message stream, they have to wait in a queue: if one application is "at the well" reading from the journal, another has to wait in line behind it. While they are waiting to catch up, the number of journalled messages keeps growing, causing those applications (which are attempting to quickly recover) to fall further behind.

Accordingly, it is desirable to estimate (in Step 112) the demand for access to the message journal by failed applications. It may be predicted or forecasted, based on current and/or past performance of the computer system, which hardware and/or software component(s) might experience a failure and which or how many applications might be impacted by the failure. A number of factors may be considered to determine the estimated demand for journal access, including but not limited to known or potential software failures, known or potential hardware failures, the number of applications or processes affected by a software or hardware failure, the speed at which an application or process accesses messages in the journal, a journal copy, or a journal segment, a desired recovery time for a failed application or process (e.g., how fast or the maximum amount of time it takes to fully recover), and expected workload of the computer system (which may vary depending the time of day or day of the week, for example).

Based on the estimated demand, the computer system may be configured to generate one or more journal copies (in Step 114) by duplicating content of the master journal and/or generate one or more journal segments (in Step 116) by duplicating content of the master journal. According to embodiments of the present invention, the journal segments may be generated either directly from the master copy (or "golden copy") of the message journal or from one of the journal copies created in Step 114. The generation of the journal copies and/or journal segments may be accomplished with a dedicated software or hardware module such as a repeater.

Next, in Step 118, the journal copies and/or journal segments may be allocated to failed applications to expedite their recovery. The allocation could be achieved in a number of ways. For example, the journal copies or segments may be pre-assigned to the failed applications or the applications to the journal copies/segments. Alternatively (and more preferably), an application may simply request access to a specified portion of the journal content and waits until it finds an unoccupied journal copy/segment—much like some grocery store checkout lines where customers form a single queue served collectively by multiple cashiers and the first person in line goes to the cashier who becomes available next. Preferably, the number of journal copies/segments is sufficiently large to accommodate the total number of failed applications such that none of the applications has to wait in a long queue for its turn. According to one embodiment, the journal copies/segments may be enough to allow immediate access by each of the failed applications or to be allocated to queues with no more than 2-3 applications in each queue.

For a more specific example, if one microsecond (i.e., 1000 nanoseconds) is chosen as the maximum recovery time and it is estimated 10 failed applications have to recover by catching up with the journal, then on average it should take no longer than 100 nanoseconds for each application to complete its access to the journal. The amount of time taken by an application to access a message may be calculated or estimated based on (a) the size of the messages in terms of X bits and/or bytes and (b) the number of nanoseconds it would take to process X bits or bytes. The maximum number of messages that could be processed in 100 nanoseconds may be calculated as a limitation on the size of journal segments.

A number of options may be available to configure the number of journal copies or journal segments. For instance, instead of having a single queue with 10 applications where only the first application could access the journal, the journal content may be replicated to a journal copy so that 2 copies of the same journal may be allocated to the 10 applications—2 queues with 5 applications per queue. Better yet, 5 copies of the same journal could be made available to the 10 applications—5 queues with 2 applications per queue, allowing 5 applications to access the journals. As a result, the recovery time for the 10 applications may be significantly shortened.

Alternatively, to the extent the 10 applications need to access different portions of the message journal, one or more journal copies may be further divided into journal segments where each segment contains a subset of the message journal having a shorter stream of sequenced messages. For instance, with the 10 failed applications, 3 journal copies may be created and one of the journal copies may be further split into three journal segments. Accordingly, 5 queues may be formed with 2 applications in each queue, where two queues of applications access two of the whole journal copies while three queues access the three journal segments. In either approach (with or without journal segments), further load-balancing may be applied to the queues of applications, for example, to adjust their respective assignments of the journal copies and/or journal segments.

After the journal copies and/or journal segments have been generated and allocated to the applications (e.g., either pre-assigned to the applications or allocated upon demand), the computer system continues to accumulate more messages in the journalled sequence. Thus, while the "golden copy" of the message journal is constantly updated with the latest sequenced messages.

However, content of the previously created journal copies/segments may become outdated and incomplete.

In the case of multiple complete journal copies, each journal copy may continue to read the sequenced stream, adding to its own journal, and it can do this without concern for becoming out of sync with other journal copies because the stream is sequenced and hence deterministic—all journals have all messages in the same order according to their sequence numbers. If any messages are missed, then a journal copy will re-request from another journal copy to back-fill missing messages. Once messages are filled, it recommences reading from the stream in real-time.

In the case of segmented journals, each journal segment, once complete, will become static and only the next actively building segment will be active. For example, if each segment holds 10 messages, and 35 messages have been written to the stream you will have 3 complete and static segments, and one actively building segment with 5 of its 10 message capacity filled. If it successfully reads the remaining 5 messages it becomes static and a fifth segment begins. If it misses any messages, let's say it dropped message #8, it will re-request message #8, and once it gets it, proceed to messages #9 and #10. There may be race conditions where while it is re-requesting #8, #9 gets sequenced and it misses #9 too so has to re-request #9. Eventually it races to catch up and re-transitions back to the real-time stream.

Thus, the only way in which a full journal copy or journal segment becomes incomplete is typically when it misses a message, which it must re-request. In the case of journal segments the complete aggregate journal record may be incomplete if the most recent, actively building segment has missed messages and is incomplete.

In Step 120, in order for the journal copies/segments to catch up with the ever-growing message journal, content of at least one of the journal copies/segments may be updated or synchronized with either the content of the master journal (i.e., the golden copy) or the content of another (more updated) journal copy/segment.

The (non-segmented) journal copies may be dynamically updating in real-time and thus continually growing in length. For journal segments, if the number of messages is limited to 1000 per journal segment, then new segments will be started with every 1001$^{st}$ message and will be updated dynamically until the 1000$^{th}$ message. If an application needs to re-request from a journal segment that is dynamically updating, it will need to only request up to the most recent message sequence number before it is "caught up" and able to start reading from the stream concurrently with the journal segment.

According to some embodiments of the present invention, the journal copies and/or journal segments may be organized into a hierarchy of multiple tiers and one journal copy/segment may be able to "catch up" from another journal copy/segment. For example, the journal copies/segments may be designated Tier-1, Tier-2, Tier-3, and so on. A Tier-1 journal copy/segment is always up-to-date with the "golden copy" and can only be accessed by Tier-2 and/or Tier-3 journal copies/segments when they have to catch up. A Tier-2 journal copy/segment can only catch up from other Tier-2 journal copies/segments and, if necessary, from a Tier-1 journal copy/segment; a Tier-3 journal copy/segment can only catch up from other Tier-3 journal copies/segments and, if necessary, from a Tier-2 or Tier-1 journal copy/segment.

MRM Controller

Figure 4:
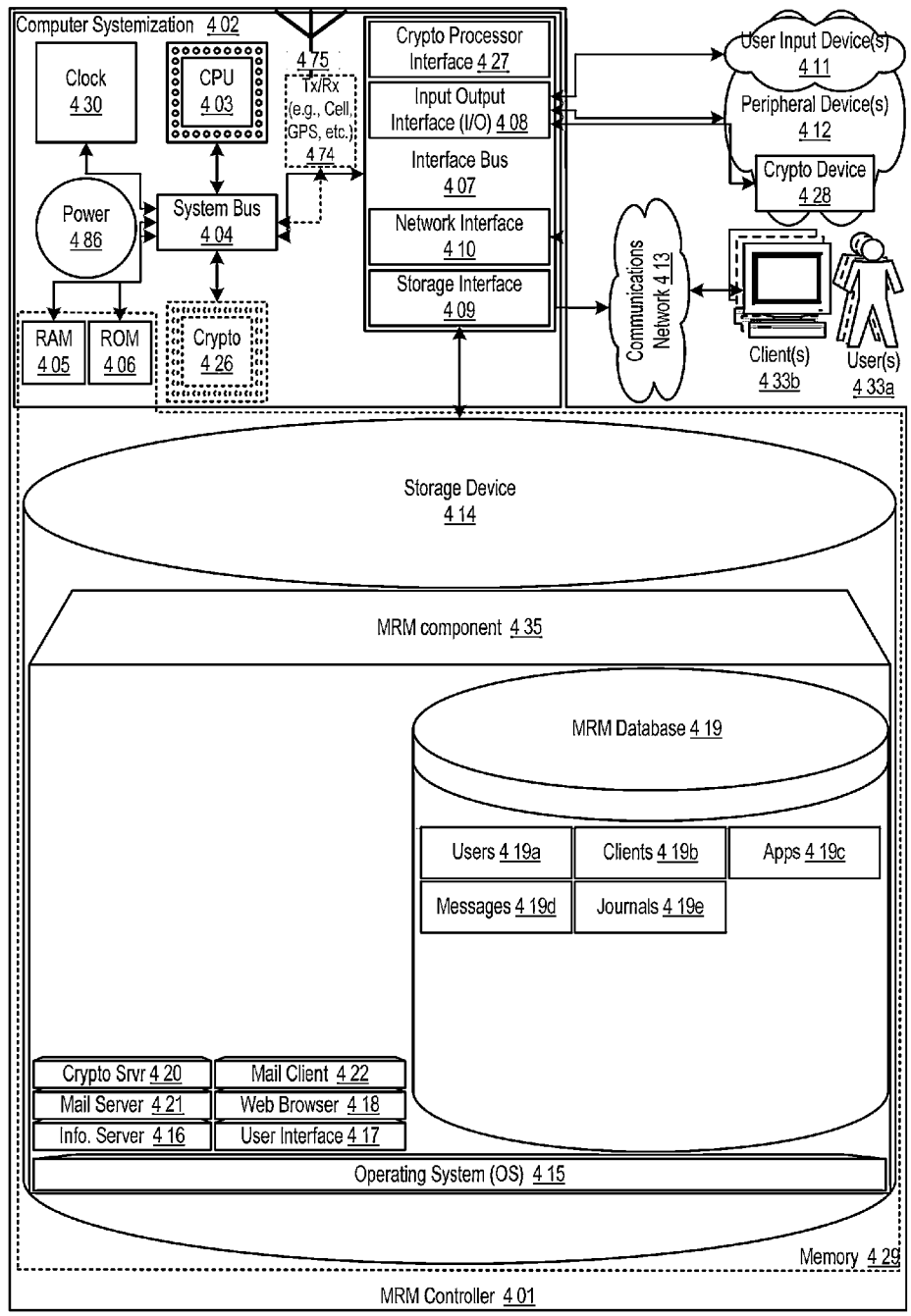
FIG. 4 shows a block diagram illustrating examples of an MRM controller according to embodiments of the present invention.

FIG. 4 shows a block diagram illustrating examples of an MRM controller 401. In this embodiment, the MRM controller 401 may serve to aggregate, process, store, search, serve, identify, instruct, generate, match, and/or facilitate interactions with a computer through various technologies, and/or other related data.

Users, e.g., 433a, which may be people and/or other systems, may engage information technology systems (e.g., computers) to facilitate information processing. In turn, computers employ processors to process information; such processors 403 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 429 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MRM controller 401 may be connected to and/or communicate with entities such as, but not limited to: one or more users from user input devices 411; peripheral devices 412; an optional cryptographic processor device 428; and/or a communications network 413. For example, the MRM controller 401 may be connected to and/or communicate with users, e.g., 433a, operating client device(s), e.g., 433b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The MRM controller 401 may be based on computer systems that may comprise, but are not limited to, components such as: a computer systemization 402 connected to memory 429.

Computer Systemization

A computer systemization 402 may comprise a clock 430, central processing unit ("CPU(s)" and/or "processor(s)" (these terms are used interchangeably throughout the disclosure unless noted to the contrary)) 403, a memory 429 (e.g., a read only memory (ROM) 406, a random access memory (RAM) 405, etc.), and/or an interface bus 407, and most frequently, although not necessarily, are all interconnected and/or communicating through a system bus 404 on one or more (mother)board(s) 402 having conductive and/or otherwise transportive circuit pathways through which instructions (e.g., binary encoded signals) may travel to effectuate communications, operations, storage, etc. The computer systemization may be connected to a power source 486; e.g., optionally the power source may be internal. Optionally, a cryptographic processor 426 and/or transceivers (e.g., ICs) 474 may be connected to the system bus. In another embodiment, the cryptographic processor and/or transceivers may be connected as either internal and/or external peripheral devices 412 via the input/output (I/O)

interface bus. In turn, the transceivers may be connected to antenna(s) 475, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing MRM controller to determine its location)); Broadcom BCM4329FKUBG transceiver chip (e.g., providing 802.11n, Bluetooth 2.1+EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and may comprise return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 429 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Cortex-M/R), application (Cortex-A), and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the MRM controller and beyond through various interfaces. Should processing requirements dictate a greater amount speed and/or capacity, distributed processors (e.g., Distributed MRM), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the MRM may be achieved by implementing a microcontroller such as CAST's R8051XC2 microcontroller; Intel's MCS 51 (i.e., 8051 microcontroller); and/or the like. Also, to implement certain features of the MRM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MRM component collection (distributed or otherwise, e.g. IMAS 341, etc) and/or features may be implemented via the microprocessor and/or via embedded components; e.g., via ASIC, coprocessor, DSP, FPGA, and/or the like. Alternately, some implementations of the MRM may be implemented with embedded components that are configured and used to achieve a variety of features or signal processing.

Depending on the particular implementation, the embedded components may include software solutions, hardware solutions, and/or some combination of both hardware/software solutions. For example, MRM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the MRM features. A hierarchy of programmable interconnects allow logic blocks to be interconnected as needed by the MRM system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the MRM may be developed on regular FPGAs and then migrated into a fixed version that more resembles ASIC implementations. Alternate or coordinating implementations may migrate MRM controller features to a final ASIC instead of or in addition to FPGAs. Depending on the implementation all of the aforementioned embedded components and microprocessors may be considered the "CPU" and/or "processor" for the MRM.

Power Source

The power source 486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 486 is connected to at least one of the interconnected subsequent components of the MRM thereby providing an electric current to all their interconnected components. In one example, the power source 486 is connected to the system bus component 404. In an alternative embodiment, an outside power source 486 is provided through a connection across the I/O 408 interface. For example, a USB and/or IEEE 1394 connection carries both data and power across the connection and is therefore a suitable source of power.

Interface Adapters

Interface bus(ses) 407 may accept, connect, and/or communicate to a number of interface adapters, frequently, although not necessarily in the form of adapter cards, such as but not limited to: input output interfaces (I/O) 408, storage interfaces 409, network interfaces 410, and/or the like. Optionally, cryptographic processor interfaces 427 similarly may be connected to the interface bus. The interface bus provides for the communications of interface adapters with one another as well as with other components of the computer systemization. Interface adapters are adapted for a compatible interface bus. Interface adapters may connect to the interface bus via an expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 409 may accept, communicate, and/or connect to a number of storage devices such as, but not limited to: storage devices 414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 410 may accept, communicate, and/or connect to a communications network 413. Through a communications network 413, the MRM controller is accessible through remote clients 433b (e.g., computers with web browsers) by users 433a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controller (e.g., Distributed 4) architectures may similarly be employed to pool, load balance, and/or otherwise increase the communicative bandwidth required by the MRM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 410 may be used to engage with various communications network types 413. For example, multiple network interfaces may be employed to allow for the communication over broadcast, multicast, and/or unicast networks.

Input Output interfaces (I/Os) 408 may accept, communicate, and/or connect to user input devices 411, peripheral devices 412, cryptographic processor devices 428, and/or the like. I/Os may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 411 often are a type of peripheral device 412 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 412 may be connected and/or communicate to I/Os and/or other facilities of the like such as network interfaces, storage interfaces, directly to the interface bus, system bus, the CPU, and/or the like. Peripheral devices may be external, internal and/or part of the MRM controller. Peripheral devices may include: antennae, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 428), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the MRM controller may be embodied as an embedded, dedicated, and/or monitor-less (i.e., headless) device, wherein access would be provided over a network interface connection.

Cryptographic units such as, but not limited to, microcontrollers, processors 426, interfaces 427, and/or devices 428 may be attached, and/or communicate with the MRM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allow for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard);/(e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 429. However, memory is a fungible technology and resource, thus, any number of memory embodiments may be employed in lieu of or in concert with one another. It is to be understood that the MRM controller and/or a computer systemization may employ various forms of memory 429. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 429 will include ROM 406, RAM 405, and a storage device 414. A storage device 414 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 429 may contain a collection of program and/or database components and/or data such as, but not limited to: operating system component(s) 415 (operating system); information server component(s) 416 (information server); user interface component(s) 417 (user interface); Web browser component(s) 418 (Web browser); database(s) 419; mail server component(s) 421; mail client component(s) 422; cryptographic server component(s) 420 (cryptographic server); the MRM component(s) 435; and/or the like (i.e., collectively a component collection). These components may be stored and accessed from the storage devices and/or from storage devices accessible through an interface bus. Although non-conventional program components such as those in the component collection, may be stored in a local storage device 414, they may also be loaded and/or stored in memory such as: peripheral devices, RAM, remote storage facilities through a communications network, ROM, various forms of memory, and/or the like.

Operating System

The operating system component 415 is an executable program component facilitating the operation of the MRM controller. The operating system may facilitate access of I/Os, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the MRM controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MRM controller to communicate with other entities through a communications network 413. Various communication protocols may be used by the MRM controller as a subcarrier transport mechanism for interaction, such as, but not limited to: multicast, TCP/IP, UDP, unicast, and/or the like.

Information Server

An information server component 416 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MRM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MRM database 419, operating systems, other program components, user interfaces, Web browsers, and/or the like.

Access to the MRM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MRM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the MRM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 417 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 418 is a stored program component that is executed by a CPU. The Web browser may be a hypertext viewing application such as Google's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly effect the obtaining and the provision of information to users, user agents, and/or the like from the MRM equipped nodes. The combined application may be nugatory on systems employing standard Web browsers.

Mail Server

A mail server component 421 is a stored program component that is executed by a CPU 403. The mail server may be an Internet mail server such as, but not limited to Apple's Mail Server (3), dovecot, sendmail, Microsoft Exchange, and/or the like. The mail server may allow for the execution of program components through facilities such as ASP, ActiveX, (ANSI) (Objective−) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/ or to the MRM.

Access to the MRM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 422 is a stored program component that is executed by a CPU 403. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 420 is a stored program component that is executed by a CPU 403, cryptographic processor 426, cryptographic processor interface 427, cryptographic processor device 428, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the MRM may encrypt all incoming and/or outgoing communications and may serve as a node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the MRM component to engage in secure transactions if so desired. The cryptographic component facilitates the secure accessing of resources on the MRM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MRM Database

The MRM database component 419 may be embodied in a database and its stored data. The database is a stored program component, which is executed by the CPU; the stored program component portion configuring the CPU to process the stored data. The database may be any of a number of fault tolerant, relational, scalable, secure database such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a "one-to-many" relationship.

Alternatively, the MRM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MRM database is implemented as a data-structure, the use of the MRM database 419 may be integrated into another component such as the MRM component 435. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 419 includes several tables 419a-e. A Users table 419a may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on an MRM. A Clients table 419b may include fields such as, but not limited to: device_ID, device_name, device_IP, device_MAC, device_type, device_model, device_version, device_OS, device_apps_list, device_securekey, and/or the like. An Apps table 419c may include fields such as, but not limited to: application_ID, application_name, application_type, application_backup_list, application_sync, and/or the like. A Messages table 419d may include fields such as, but not limited to: msg_id, msg_application, timestamp, msg_details_list, message_size, message_origin, msg_journal, msg_read_detail, and/or the like. A Journals table 419e may include fields such as, but not limited to: journal_ID, journal_timestamp, msg_source, journal_access_apps, segmented_msg_list, and/or the like.

In one embodiment, the MRM database may interact with other database systems. For example, employing a distributed database system, queries and data access by search MRM component may treat the combination of the MRM database, an integrated data security layer database as a single database entity.

In one embodiment, user programs may contain various user interface primitives, which may serve to update the MRM. Also, various accounts may require custom database tables depending upon the environments and the types of clients the MRM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 419a-e. The MRM may be configured to keep track of various settings, inputs, and parameters via database controllers.

The MRM database may communicate to and/or with other components in a component collection, including itself, and/or facilities of the like. Most frequently, the MRM database communicates with the MRM component, other program components, and/or the like. The database may contain, retain, and provide information regarding other nodes and data.

The MRMs

The MRM component 435 is a stored program component that is executed by a CPU. In one embodiment, the MRM component incorporates any and/or all combinations of the aspects of the MRM discussed in the previous figures. As such, the MRM affects accessing, obtaining and the provision of information, services, transactions, and/or the like across various communications networks.

The MRM component may transform Error! Reference source not found. via MRM components into Error! Reference source not found., and/or the like and use of the MRM. In one embodiment, the MRM component 435 takes inputs (e.g., complete message journals 201 and 301; and/or the like) etc., and transforms the inputs via various MRM components into outputs (e.g., duplicate copies of the complete message journals 202-204; journals containing segments of complete message 302-304; and/or the like).

The MRM component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the MRM server employs a cryptographic server to encrypt and decrypt communications. The MRM component may communicate to and/or with other components in a component collection, including itself, and/or facilities of the like. Most frequently, the MRM component communicates with the MRM database, operating systems, other program components, and/or the like. The MRM may contain, communicate, generate, obtain, and/or provide program component, system, user, and/or data communications, requests, and/or responses.

Distributed MRMs

The structure and/or operation of any of the MRM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the MRM controller will depend on the context of system deployment. Factors such as, but not limited to, the budget, capacity, location, and/or use of the underlying hardware resources may affect deployment requirements and configuration. Regardless of whether the configuration results (i) in more consolidated and/or integrated program components, (ii) in a more distributed series of program components, and/or (iii) in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, parsing mechanism itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MRM controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:
http://publib.boulder.ibm.com/infocenter/tivihelp/v2r1/index.jsp?topic=/com.ibm.IBMDI.doc/referenceguide259.htm
all of which are hereby expressly incorporated by reference herein.

In order to address various issues and advance the art, the entirety of this application (including the Cover Page, Title, Headings, Field, Background, Summary, Brief Description of the Drawings, Detailed Description, Claims, Abstract, Figures, Appendices and/or otherwise) shows, by way of illustration, various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components, and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like also are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of an MRM individual and/or enterprise user, database configuration and/or relational model, data type, data transmission and/or network framework, syntax structure, and/or the like, various embodiments of the MRM may be implemented that allow a great deal of flexibility and customization. While various embodiments and discussions of the MRM have been directed to application message journaling management, however, it is to be understood that the embodiments described herein may be readily configured and/or customized for a wide variety of other applications and/or implementations.

What is claimed is:

1. An expedited message retransmission method for a computer system, comprising:
   maintaining, in a storage medium of the computer system, a master journal of sequenced messages generated from a plurality of messages written by applications or processes during operations of the computer system, at least one subset of said applications or processes requiring access to said sequenced messages to function properly;
   determining an estimated demand for access to said sequenced messages by said at least one subset of applications or processes that may experience failovers;
   generating, based on said estimated demand, one or more journal copies and/or one or more journal segments by duplicating content of said master journal, each said journal copy or journal segment being independently accessible by a single application or process at any given moment; and
   allocating said one or more journal copies and/or said one or more journal segments, upon demand, to some of said at least one subset of said applications or processes that have experienced failovers or a gap in said sequenced messages, such that multiple applications or processes can simultaneously access the content of said master journal, thereby expediting access to said sequenced messages in said master journal by said some applications or processes in their recovery from said failovers or said gap in said sequenced messages.

2. The method of claim 1, wherein said plurality of messages written by said applications or processes during operations of the computer system are transformed to said sequenced messages by a sequencer.

3. The method of claim 2, wherein said sequencer re-publishes said plurality of sequenced messages to said applications or processes.

4. The method of claim 1, wherein said one or more journal copies and/or said one or more journal segments are generated by a dedicated software or hardware module.

5. The method of claim 1, further comprising:
   updating content of said one or more journal copies and/or said one or more journal segments with updated content of said master journal.

6. The method of claim 1, further comprising:
   updating or recovering content of a first of said one or more journal copies and/or said one or more journal segments based on content of a second of said one or more journal copies and/or said one or more journal segments.

7. The method of claim 1, further comprising:
dividing said one or more journal copies and/or said one or more journal segments into at least a first tier and a second tier; and
restricting updating of or recovering of content by a second-tier journal copy/segment to be based on content of either another second-tier journal copy/segment or a first-tier journal copy/segment.

8. The method of claim 1, wherein said computer system is selected from a group consisting of: an electronic trading system; an auction-based sale system; and a gaming system.

9. The method of claim 1, wherein the estimated demand is determined based on one or more factors selected from a group consisting of:
known or potential software failures;
known or potential hardware failures;
a number of applications or processes affected by a software or hardware failure;
a speed at which an application or process accesses a message in said journal, a journal copy, or a journal segment;
a desired recovery time for a failed application or process; and
expected workload of the computer system.

10. A computer system implementing expedited message retransmission, comprising:
at least one computer processor; and
at least one storage medium disposed in communication with the at least one computer processor and storing computer instructions to cause the at least one computer processor to:
maintain, in said at least one storage medium of the computer system, a master journal of sequenced messages generated from a plurality of messages written by applications or processes during operations of the computer system, at least one subset of said applications or processes requiring access to said sequenced messages to function properly;
determine an estimated demand for access to said sequenced messages by said at least one subset of applications or processes that may experience failovers;
generate, based on said estimated demand, one or more journal copies and/or one or more journal segments by duplicating content of said master journal, each said journal copy or journal segment being independently accessible by a single application or process at any given moment; and
allocate said one or more journal copies and/or said one or more journal segments, upon demand, to some of said at least one subset of said applications or processes that have experienced failovers or a gap in said sequenced messages, such that multiple applications or processes can simultaneously access the content of said master journal, thereby expediting access to said sequenced messages in said master journal by said some applications or processes in their recovery from said failovers or said gap in said sequenced messages.

11. The computer system of claim 10, wherein said plurality of messages written by said applications or processes during operations of the computer system are transformed to said sequenced messages by a sequencer.

12. The computer system of claim 11, wherein said sequencer re-publishes said plurality of sequenced messages to said applications or processes.

13. The computer system of claim 10, wherein said one or more journal copies and/or said one or more journal segments are generated by a dedicated software or hardware module.

14. The computer system of claim 10, further configured to:
update content of said one or more journal copies and/or said one or more journal segments with updated content of said master journal.

15. The computer system of claim 10, further configured to:
update or recover content of a first of said one or more journal copies and/or said one or more journal segments based on content of a second of said one or more journal copies and/or said one or more journal segments.

16. The computer system of claim 1 further configured to:
divide said one or more journal copies and/or said one or more journal segments into at least a first tier and a second tier; and
restrict updating of or recovering of content by a second-tier journal copy/segment to be based on content of either another second-tier journal copy/segment or a first-tier journal copy/segment.

17. The computer system of claim 10, wherein said computer system is selected from a group consisting of: an electronic trading system; an auction-based sale system; and a gaming system.

18. The computer system of claim 10, wherein the estimated demand is determined based on one or more factors selected from a group consisting of:
known or potential software failures;
known or potential hardware failures;
a number of applications or processes affected by a software or hardware failure;
a speed at which an application or process accesses a message in said journal, a journal copy, or a journal segment;
a desired recovery time for a failed application or process; and
expected workload of the computer system.

19. A non-transitory computer readable medium having computer instructions which, when executed, causes a computer system to implement expedited message retransmission, the non-transitory computer readable medium comprising code for:
maintaining, in a storage medium of the computer system, a master journal of sequenced messages generated from a plurality of messages written by applications or processes during operations of the computer system, at least one subset of said applications or processes requiring access to said sequenced messages to function properly;
determining an estimated demand for access to said sequenced messages by said at least one subset of applications or processes that may experience failovers;
generating, based on said estimated demand, one or more journal copies and/or one or more journal segments by duplicating content of said master journal, each said journal copy or journal segment being independently accessible by a single application or process at any given moment; and
allocating said one or more journal copies and/or said one or more journal segments, upon demand, to some of said at least one subset of said applications or processes that have experienced failovers or a gap in said sequenced messages, such that multiple applications or processes can simultaneously access the content of said master journal, thereby expediting access to said sequenced messages in said master journal by said some applications or processes in their recovery from said failovers or said gap in said sequenced messages.

* * * * *